United States Patent
Zheng (10) Patent No.: US 11,030,715 B2
(45) Date of Patent: Jun. 8, 2021

(54) IMAGE PROCESSING METHOD AND APPARATUS

(71) Applicant: Huawei Technologies Co., Ltd., Shenzhen (CN)

(72) Inventor: Chenglin Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 16/544,066

(22) Filed: Aug. 19, 2019

(65) Prior Publication Data

US 2019/0370933 A1  Dec. 5, 2019

Related U.S. Application Data

(63) Continuation of application No. PCT/CN2018/076647, filed on Feb. 13, 2018.

(30) Foreign Application Priority Data

Apr. 28, 2017 (CN) .......................... 201710291707.6

(51) Int. Cl.
*G06T 3/40* (2006.01)
*G06T 7/13* (2017.01)

(52) U.S. Cl.
CPC ............ *G06T 3/403* (2013.01); *G06T 3/4007* (2013.01); *G06T 7/13* (2017.01)

(58) Field of Classification Search
CPC .......... G06T 3/4007; G06T 3/403; G06T 7/13
See application file for complete search history.

(56) References Cited

U.S. PATENT DOCUMENTS

| | | | |
|---|---|---|---|
| 6,285,798 B1* | 9/2001 | Lee | G06T 5/004 |
| | | | 382/260 |
| 6,548,804 B1* | 4/2003 | Yuhara | G06K 9/00362 |
| | | | 250/208.1 |
| 8,842,939 B2 | 9/2014 | Chien et al. | |
| 2004/0032985 A1* | 2/2004 | Kawakami | G06T 7/246 |
| | | | 382/199 |
| 2005/0094900 A1* | 5/2005 | Abe | G06T 7/12 |
| | | | 382/300 |

(Continued)

FOREIGN PATENT DOCUMENTS

| CN | 101556689 A | 10/2009 |
|---|---|---|
| CN | 101849246 A | 9/2010 |
| CN | 102881000 A | 1/2013 |

OTHER PUBLICATIONS

Lai et al. ("Adaptive image scaling based on local edge directions," International Conference on Intelligent and Advanced Systems, Jun. 15-17, 2010) (Year: 2010).*

(Continued)

*Primary Examiner* — Yubin Hung
(74) *Attorney, Agent, or Firm* — Conley Rose, P.C.

(57) ABSTRACT

An image processing method includes obtaining a difference map of an original image, obtaining an edge feature parameter of a first pixel in an intermediate image based on a pixel value of a pixel in the difference map, obtaining an edge feature parameter of a second pixel in a target image based on the edge feature parameter, and obtaining the target image based on the edge feature parameter of the second pixel.

20 Claims, 6 Drawing Sheets

(56) References Cited

U.S. PATENT DOCUMENTS

| | | | |
|---|---|---|---|
| 2010/0225646 A1* | 9/2010 | Wei | G06T 3/00 |
| | | | 345/419 |
| 2010/0260433 A1 | 10/2010 | Zhang et al. | |
| 2012/0230601 A1* | 9/2012 | Iso | G06T 5/002 |
| | | | 382/269 |
| 2013/0051702 A1* | 2/2013 | Chien | G06T 3/403 |
| | | | 382/300 |
| 2013/0251288 A1* | 9/2013 | Kobiki | G06T 5/003 |
| | | | 382/298 |
| 2014/0072232 A1* | 3/2014 | Zheng | G06T 3/4053 |
| | | | 382/199 |
| 2016/0253779 A1* | 9/2016 | Park | G06T 3/403 |
| | | | 382/264 |
| 2017/0178303 A1* | 6/2017 | Yan | G06T 5/20 |

OTHER PUBLICATIONS

Li et al. ("Image Magnification through Non-local Edge Directed Interpolation," Fourth International Conference on Digital Home, Nov. 23-25, 2012) (Year: 2012).*
Machine Translation and Abstract of Chinese Publication No. CN101556689, Oct. 14, 2009, 9 pages.
Foreign Communication From A Counterpart Application, International Application No. PCT/CN2018/076647, English Translation of International Search Report dated May 22, 2018, 2 pages.

* cited by examiner

IMAGE PROCESSING METHOD AND APPARATUS

CROSS-REFERENCE TO RELATED APPLICATIONS

This application is a continuation of International Patent Application No. PCT/CN2018/076647 filed on Feb. 13, 2018, which claims priority to Chinese Patent Application No. 201710291707.6 filed on Apr. 28, 2017. The disclosures of the aforementioned applications are incorporated herein by reference in their entireties.

TECHNICAL FIELD

This application relates to the field of image processing technologies, and in particular, to an image processing method and apparatus.

BACKGROUND

With development of a device (such as a mobile phone or a television), screen resolution of the device is increasingly high, and there are many 2K (2560×1440 pixels), 4K (3840×2160 pixels), or even 8K (7680×4320 pixels) screens. However, currently, most images are still low-resolution images. Therefore, an image processing method is urgently required to convert these low-resolution images into high-resolution images, to implement high-quality display on a high-resolution screen.

An image processing method includes bilinear interpolation, bicubic interpolation, multi-phase interpolation, and the like. In these interpolation methods, only a distance relationship between an interpolation point and an adjacent point is considered, but an edge feature of an image is not considered. After processing, a phenomenon such as blurring and an edge zigzag may occur on the image, greatly affecting image quality. To resolve the problem of the image processing method, the image is processed using a direction-based interpolation method in a related technology to obtain a target image whose resolution is greater than that of the original image. A processing process further includes the direction-based interpolation method, performing upsampling (also referred to as interpolation or enlargement processing) once on the original image using a target multiple, and then performing, using the same multiple, downsampling (also referred to as shrinkage processing) once on an image obtained through upsampling, to obtain a plurality of phase images with same resolution as the original image, where each phase image includes pixels with a same phase in the image obtained through upsampling; performing upsampling once on each phase image obtained through downsampling, then performing downsampling once on an image obtained by performing upsampling on each phase image, and for each phase image, obtaining a target image whose phase is the same as that of the phase image, further obtaining differences between pixel values of pixels in each target image and pixel values of pixels at corresponding locations in the original image, to obtain a plurality of difference sets, and combining these difference sets into one difference map whose resolution is the target multiple of resolution of the original image, where pixel values of pixels in the difference map are differences in the plurality of difference sets, such that one difference map can be obtained for an interpolation method based on each direction, and a plurality of difference maps can be obtained for an interpolation method based on a plurality of directions, where each difference map corresponds to one direction, and the pixel value of the pixel in the difference map is used to indicate a difference between a pixel value of a pixel in the original image and a pixel value of a pixel at a corresponding location in the image obtained through second downsampling; and then determining a most accurate interpolation method for each pixel in the target image based on magnitudes of pixel values of pixels in these difference maps, obtaining pixel values that are of the pixels and that are obtained based on the most accurate interpolation methods for the pixels, and determining the pixel values as final pixel values of the pixels, to obtain the target image.

A pixel A in the target image is used as an example. A device subtracts a pixel value of the pixel A in the image obtained through second downsampling from a pixel value of a pixel at a corresponding location in the original image, to obtain a difference. For the pixel A, n different differences can be obtained using an interpolation method based on n directions, and each difference corresponds to an interpolation method based on one direction. The device may select a minimum difference from the n different differences, determine an interpolation method corresponding to the minimum difference, further obtain a pixel value that is of the pixel A and that is obtained according to the interpolation method, and use the pixel value as a final pixel value of the pixel A in the target image.

In an image processing process in the foregoing technology, downsampling needs to be performed, using the same multiple, on the image obtained through first upsampling. This is equivalent to that pixels with a same phase are extracted from the image obtained through first upsampling to form an image with a same size as the original image, second upsampling is further performed on these images obtained through downsampling, then each pixel that is in a one-to-one correspondence with a location of a pixel in the original image is extracted from the image obtained through second upsampling, and a pixel value of each pixel is subtracted from a pixel value of a corresponding pixel in the original image, to obtain a difference. Therefore, locations of the pixels need to be strictly corresponding. For a requirement for performing scaling using a non-integer multiple, for example, if a target image whose resolution is 1.5 times the resolution of the original image needs to be obtained, it is very difficult to match the locations of the pixels in the original image against the locations of the pixels in the target image because a location of interpolation performed between every two pixels is not fixed. Consequently, the foregoing technology cannot meet the requirement for performing scaling using the non-integer multiple, in other words, the foregoing technology is not applicable to scaling performed using any multiple.

SUMMARY

Embodiments of this application provide an image processing method and apparatus, to resolve a problem that a related technology is not applicable to scaling performed using any multiple. The technical solutions are as follows.

According to a first aspect, an image processing method is provided. The method includes obtaining a plurality of difference maps of an original image; obtaining an edge feature parameter of each first pixel in an intermediate image based on pixel values of pixels in the plurality of difference maps, where the edge feature parameter includes an edge direction and an edge strength, resolution of the intermediate image is an integer multiple of resolution of the original image, and the integer multiple is the same as a scaling multiple used when the plurality of difference maps are obtained; obtaining, based on the edge feature parameter of each first pixel in the intermediate image, an edge feature parameter of each second pixel whose pixel value is unknown in a target image, where resolution of the target image is any multiple of the resolution of the intermediate image; and determining a pixel value of each second pixel based on the edge feature parameter of each second pixel, to obtain the target image.

The pixel value of the pixel may be a grayscale value, a red, green, and blue (RGB) value, or another expression manner that can represent a color of the pixel. The edge direction is a tangent direction of the pixel at an image edge. The edge strength is used to indicate a possibility that the pixel is at the image edge or strength of the pixel edge. The resolution refers to a quantity of pixels included in per inch of image. The edge feature parameter may also be referred to as texture information.

According to the method provided in this embodiment of this application, an accurate edge feature parameter of each second pixel whose pixel value is unknown in the target image enlarged using any multiple is obtained based on the edge feature parameter of each first pixel in the intermediate image enlarged using an integer multiple, and the pixel value of each second pixel is further obtained through interpolation based on the accurate edge feature parameter, such that a problem such as an edge zigzag and image blurring in an interpolation method is overcome, and a requirement for performing scaling on an image using any multiple is met.

In a first possible implementation of the first aspect, the obtaining an edge feature parameter of each first pixel in an intermediate image based on pixel values of pixels in the plurality of difference maps includes, for each first pixel, obtaining a minimum value and an average value of pixel values of pixels that are in the plurality of difference maps and that correspond to a location of the first pixel; and determining, as the edge direction of the first pixel, a direction corresponding to a difference map in which a pixel corresponding to the minimum value is located, and determining the edge strength of the first pixel based on a difference between the minimum value and the average value.

According to the method provided in this embodiment of this application, the pixel values of the pixels in the plurality of difference maps are obtained by performing subtraction between pixels in an image obtained through interpolation based on a direction and pixels in the original image. Therefore, the edge direction and the edge strength that are of the first pixel can be accurately obtained based on the pixel values of the pixels in the plurality of difference maps, and a manner of accurately obtaining the edge feature parameter of each first pixel in the intermediate image is provided.

In a second possible implementation of the first aspect, the obtaining, based on the edge feature parameter of each first pixel in the intermediate image, an edge feature parameter of each second pixel whose pixel value is unknown in a target image includes, for each second pixel, determining an edge feature parameter of a first target pixel in the first pixels as the edge feature parameter of the second pixel, where a distance between a location of the first target pixel in the original image and a location of the second pixel in the original image is the shortest; or determining the edge feature parameter of the second pixel based on edge feature parameters of a plurality of pixels in the first pixels, where distances between locations of the plurality of pixels in the original image and a location of the second pixel in the original image are less than a preset threshold.

According to the method provided in this embodiment of this application, the edge feature parameter of the second pixel may be obtained based on an edge feature parameter of a first pixel closest to the second pixel, or the edge feature parameter of the second pixel may be obtained based on edge feature parameters of a plurality of first pixels adjacent to the second pixel. Therefore, two manners of obtaining the edge feature parameter of each second pixel whose pixel value is unknown in the target image are provided.

In a third possible implementation of the first aspect, the determining the edge feature parameter of the second pixel based on edge feature parameters of a plurality of second target pixels in the first pixels includes determining a target direction based on the edge feature parameters of the plurality of pixels, where edge directions of most second target pixels in the plurality of pixels are the target direction; and determining the target direction as an edge direction of the second pixel, and determining, as an edge strength of the second pixel, an average value or a minimum value of edge strengths of the pixels whose edge directions are the target direction in the plurality of pixels.

According to the method provided in this embodiment of this application, an edge direction of a majority of first pixels that have a consistent edge direction in a plurality of first pixels adjacent to the second pixel is determined as the edge direction of the second pixel, and an average value or a minimum value of edge strengths of the plurality of first pixels is determined as the edge strength of the second pixel. Therefore, a manner of determining an edge feature parameter of a pixel based on edge feature parameters of a plurality of pixels adjacent to the pixel is provided.

In a fourth possible implementation of the first aspect, the determining a pixel value of each second pixel based on the edge feature parameter of each second pixel includes: for each second pixel, obtaining a first pixel value of the second pixel through interpolation based on an edge direction of the second pixel; obtaining a second pixel value of the second pixel through interpolation based on a non-edge direction, where the interpolation based on the non-edge direction includes bilinear interpolation, bicubic interpolation, or multi-phase interpolation; determining weights of the first pixel value and the second pixel value based on an edge strength of the second pixel; and performing weighted summation on the first pixel value and the second pixel value based on the weights, to obtain the pixel value of the second pixel.

According to the method provided in this embodiment of this application, weights of two interpolation results obtained through interpolation based on the edge direction and based on the non-edge direction are determined based on the edge strength of the second pixel, and weighted summation is performed on the two interpolation results to obtain the pixel value of the second pixel. Therefore, a manner of determining a pixel value based on an edge feature parameter of the pixel is provided. In this manner, an edge zigzag is reduced and image quality is improved, and accuracy of the interpolation results can be improved.

According to a second aspect, an image processing apparatus is provided. The apparatus includes a plurality of function modules, and the plurality of function modules are configured to perform the image processing method provided in any one of the first aspect or the possible implementations of the first aspect.

According to a third aspect, an image processing device is provided. The image processing device includes a processor, configured to: obtain a plurality of difference maps of an original image; obtain an edge feature parameter of each first pixel in an intermediate image based on pixel values of pixels in the plurality of difference maps, where the edge feature parameter includes an edge direction and an edge strength, resolution of the intermediate image is an integer multiple of resolution of the original image, and the integer multiple is the same as a scaling multiple used when the plurality of difference maps are obtained; obtain, based on the edge feature parameter of each first pixel in the intermediate image, an edge feature parameter of each second pixel whose pixel value is unknown in a target image, where resolution of the target image is any multiple of the resolution of the intermediate image; and determine a pixel value of each second pixel based on the edge feature parameter of each second pixel, to obtain the target image.

In a possible implementation, the processor is configured to, for each first pixel, obtain a minimum value and an average value of pixel values of pixels that are in the plurality of difference maps and that correspond to a location of the first pixel; and determine, as the edge direction of the first pixel, an edge direction corresponding to a difference map in which a pixel corresponding to the minimum value is located, and determine the edge strength of the first pixel based on a difference between the minimum value and the average value.

In a possible implementation, the processor is configured to, for each second pixel, determine an edge feature parameter of a first target pixel in the first pixels as the edge feature parameter of the second pixel, where a distance between a location of the first target pixel in the original image and a location of the second pixel in the original image is the shortest; or determine the edge feature parameter of the second pixel based on edge feature parameters of a plurality of pixels in the first pixels, where distances between locations of the plurality of pixels in the original image and a location of the second pixel in the original image are less than a preset threshold.

In a possible implementation, the processor is configured to determine a target direction based on the edge feature parameters of the plurality of pixels, where edge directions of most pixels in the plurality of pixels are the target direction; and determine the target direction as an edge direction of the second pixel, and determine, as an edge strength of the second pixel, an average value or a minimum value of edge strengths of the pixels whose edge directions are the target direction in the plurality of pixels.

In a possible implementation, the processor is configured to, for each second pixel, obtain a first pixel value of the second pixel through interpolation based on an edge direction of the second pixel; obtain a second pixel value of the second pixel through interpolation based on a non-edge direction, where the interpolation based on the non-edge direction includes bilinear interpolation, bicubic interpolation, or multi-phase interpolation; determine weights of the first pixel value and the second pixel value based on an edge strength of the second pixel; and perform weighted summation on the first pixel value and the second pixel value based on the weights, to obtain the pixel value of the second pixel.

DESCRIPTION OF EMBODIMENTS

To make the objectives, technical solutions, and advantages of this application clearer, the following further describes the implementations of this application in detail with reference to the accompanying drawings.

Figure 1:
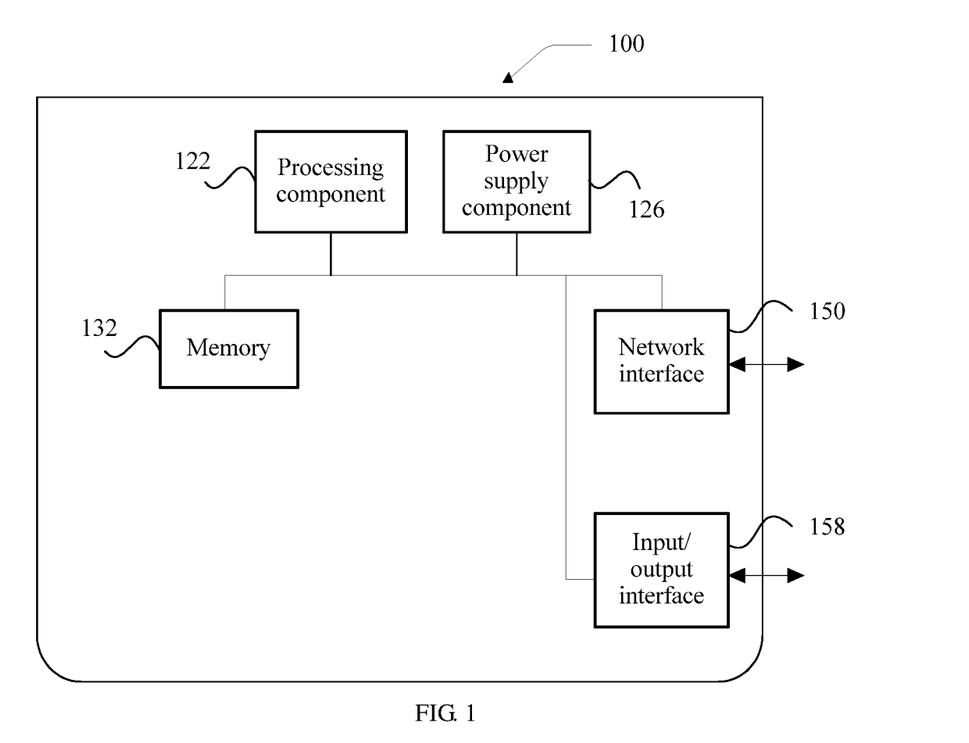
FIG. 1 is a schematic structural diagram of an image processing device 100 according to an embodiment of this application.

FIG. 1 is a schematic structural diagram of an image processing device 100 according to an embodiment of this application. Referring to FIG. 1, the image processing device 100 includes a processing component 122, that further includes one or more processors, and a storage resource represented by a memory 132 that is configured to store an instruction that may be executed by the processing component 122, for example, an application program. The application program stored in the memory 132 may include one or more modules that each correspond to a set of instructions. In addition, the processing component 122 is configured to execute the instruction to perform a method in the following embodiment.

The image processing device 100 may further include a power supply component 126 configured to perform power management on the image processing device 100, a wired or wireless network interface 150 configured to connect the image processing device 100 to a network, and an input/output (I/O) interface 158. The image processing device 100 may operate an operating system based on the application program stored in the memory 132, for example, WINDOWS SERVER, MAC OS X, UNIX, LINUX, or FREEBSD.

Figure 2:
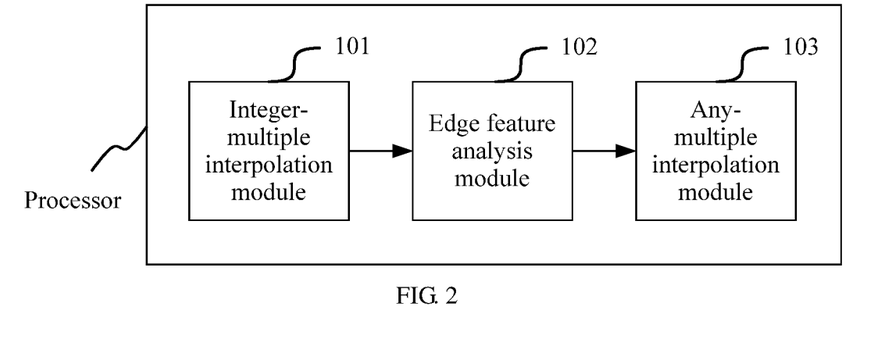
FIG. 2 is a schematic diagram of a function structure of a processor according to an embodiment of this application.

A plurality of functions may be configured in the processor included in the processing component 122. FIG. 2 is a schematic diagram of a function structure of the processor according to an embodiment of this application. The plurality of functions may be implemented using an integer-multiple interpolation module 101, an edge feature analysis module 102, and an any-multiple interpolation module 103.

Figure 3:
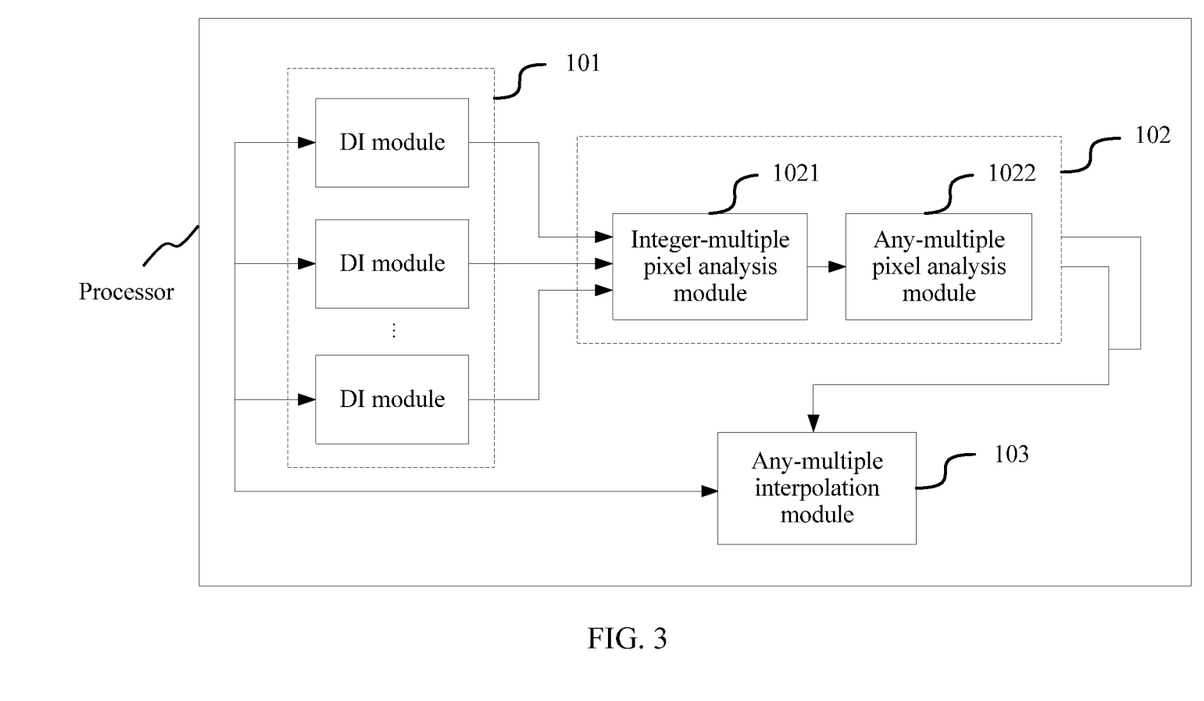
FIG. 3 is a schematic diagram of a function structure of a processor according to an embodiment of this application.
Figure 4:
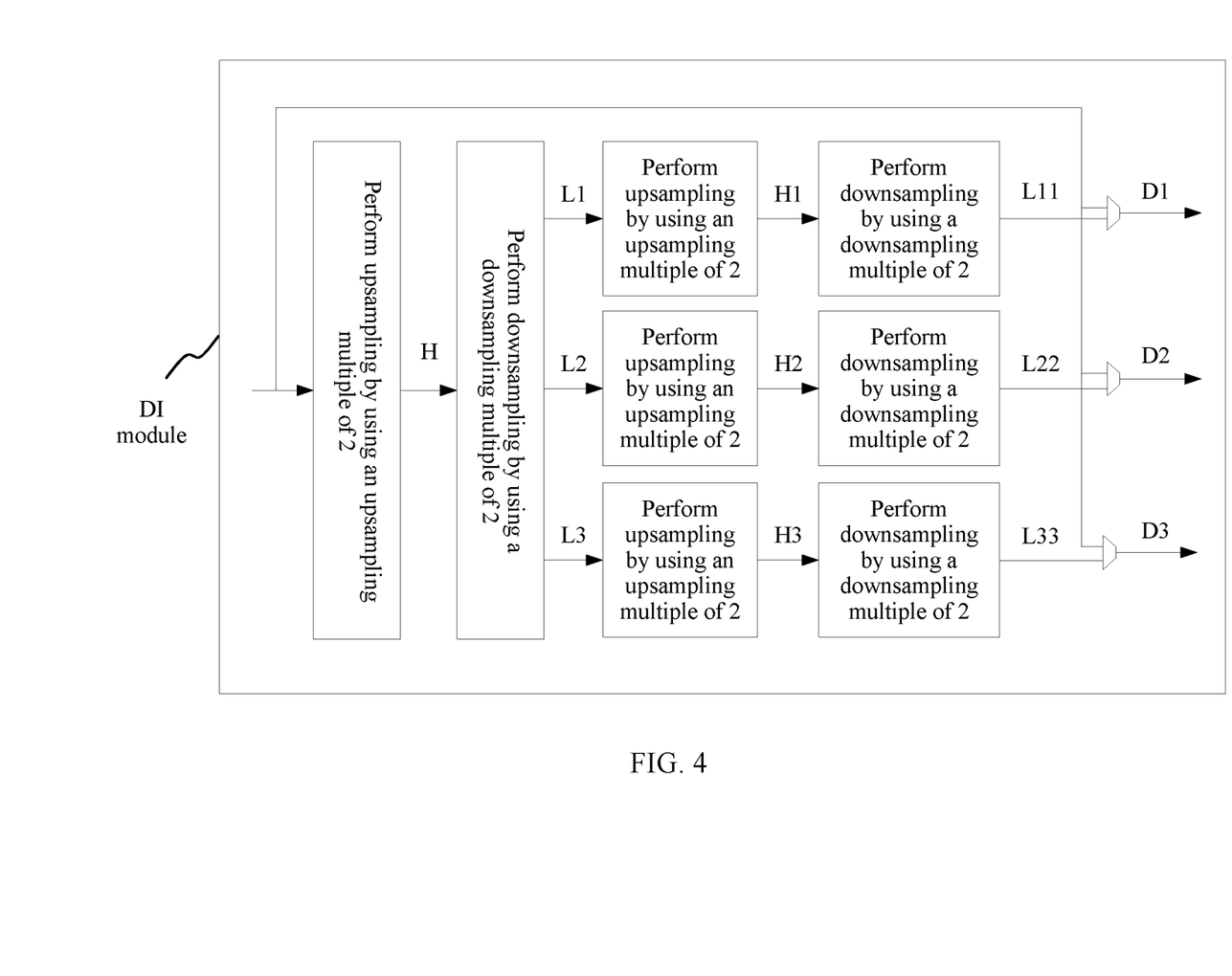
FIG. 4 is a schematic diagram of a DI module according to an embodiment of this application.

FIG. 3 is a schematic diagram of a function structure of the processor according to an embodiment of this application. The integer-multiple interpolation module 101 includes n integer-multiple double interpolation (DI) modules, and n represents an interpolation method based on n directions. For example, n is 4 or 8. If n=4, interpolation is performed based on four directions (0°, 45°, 90°, and 135°); or if n=8, interpolation is performed based on eight directions (0°, 22.5°, 45°, 67.5°, 90°, 112.5°, 135°, and 157.5°). For example, the integer multiple is 2. FIG. 4 is a schematic diagram of a DI module according to an embodiment of this application. The DI module is configured to alternately perform upsampling (also referred to as interpolation or enlargement processing) and downsampling (also referred to as shrinkage processing) twice on an original image using the integer multiple, then perform subtraction between pixel values of pixels in each image obtained through second downsampling and pixel values of pixels at corresponding locations in the original image, to obtain a plurality of difference sets, such as D1, D2, or D3 in FIG. 4, and then combine the plurality of difference sets and a 0-element set (all elements are 0, and a quantity of the elements is the same as a quantity of differences in each difference set), such that the DI module can obtain, using an interpolation method based on each direction, one difference map whose resolution is two times resolution of the original image, where pixel values of pixels in the difference map are values of elements in the plurality of difference sets and the 0-element set, and the n DI modules can obtain a plurality of difference maps using an interpolation method based on a plurality of directions.

Referring to FIG. 3, the edge feature analysis module 102 includes an integer-multiple pixel analysis module 1021 and an any-multiple pixel analysis module 1022. The integer-multiple pixel analysis module 1021 may obtain an edge feature parameter of an integer-multiple pixel through analysis based on pixel values of pixels in the plurality of difference maps output by the integer-multiple interpolation module 101, where the integer-multiple pixel is a pixel in an intermediate image, and resolution of the intermediate image is an integer multiple of the resolution of the original image. The any-multiple pixel analysis module 1022 may further obtain an edge feature parameter of an any-multiple pixel through analysis based on the edge feature parameter of the integer-multiple pixel, where the any-multiple pixel is a pixel in a target image, and resolution of the target image is any multiple of the resolution of the original image.

Figure 5:
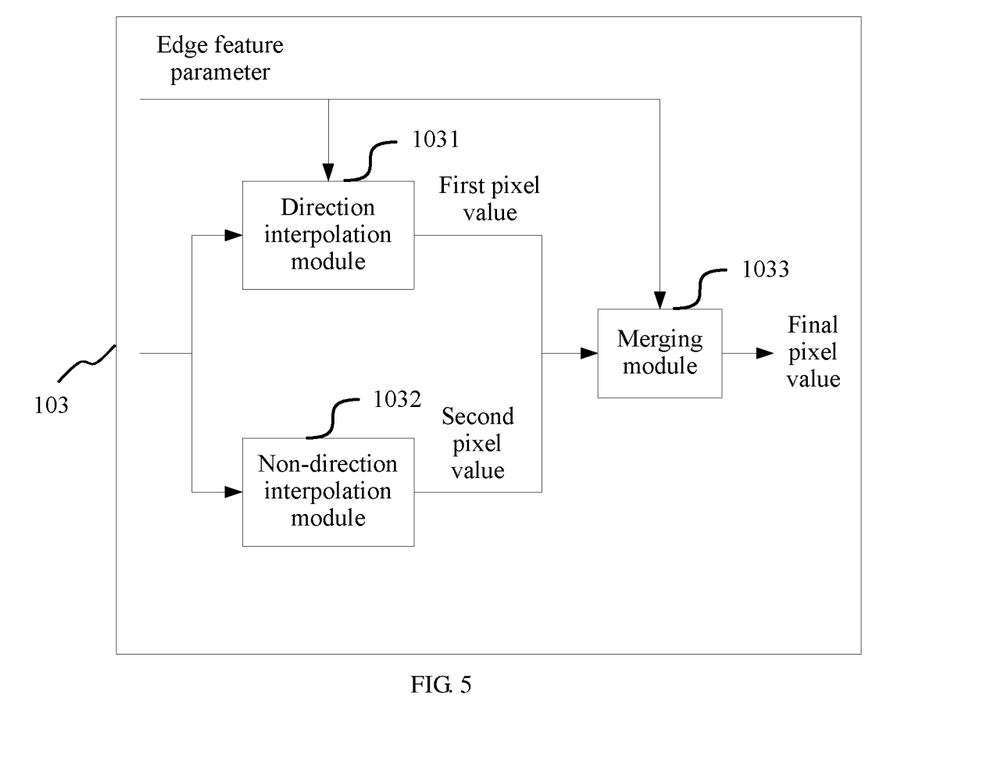
FIG. 5 is a schematic diagram of an any-multiple interpolation module 103 according to an embodiment of this application.

The any-multiple interpolation module 103 may perform interpolation processing on the original image based on the edge feature parameter of the any-multiple pixel, to obtain a pixel value of the any-multiple pixel. FIG. 5 is a schematic diagram of the any-multiple interpolation module 103 according to an embodiment of this application. The any-multiple interpolation module 103 includes a direction interpolation module 1031, a non-direction interpolation module 1032, and a merging module 1033. The direction interpolation module 1031 obtains, through interpolation based on a direction, a first pixel value of a pixel whose pixel value is unknown, the non-direction interpolation module 1032 obtains, through interpolation based on a method, a second pixel value of the pixel whose pixel value is unknown, and the merging module 1033 is configured to merge interpolation results obtained by the direction interpolation module 1031 and the non-direction interpolation module 1032, for example, perform weighted summation on the first pixel value and the second pixel value to obtain a final pixel value of the pixel whose pixel value is unknown.

Figure 6:
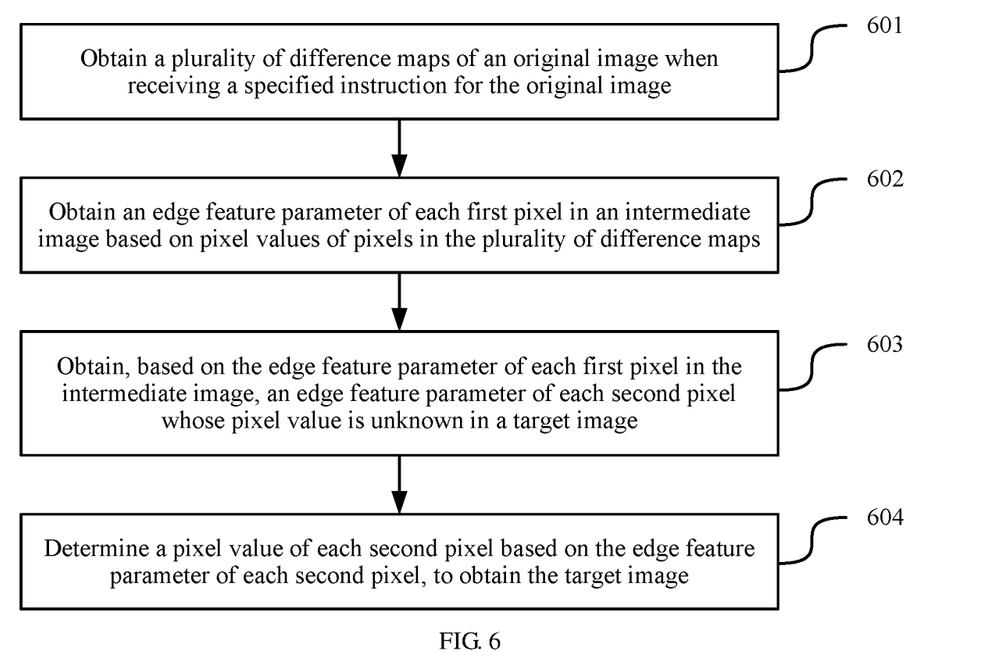
FIG. 6 is a schematic flowchart of an image processing method according to an embodiment of this application.

FIG. 6 is a schematic flowchart of an image processing method according to an embodiment of this application. The image processing method may be performed by an image processing device. Steps performed by the image processing device may be completed by different modules of the image processing device. Referring to FIG. 6, the image processing method includes the following steps.

601. Obtain a plurality of difference maps of an original image when receiving a specified instruction for the original image, where the specified instruction is used to obtain a target image, and resolution of the target image is any multiple of resolution of the original image.

The specified instruction may be an image processing instruction, and the image processing instruction may be triggered by a selection operation performed by a user on an image processing option. The image processing option is used to convert a low-resolution original image into a high-resolution target image. Certainly, the specified instruction may alternatively be a display instruction, and the display instruction may be triggered by an opening operation performed by the user on the original image. For example, the image processing device may provide a screen for displaying an image, and the screen has specified screen resolution. If resolution of a to-be-displayed original image is lower than the screen resolution, the image processing device needs to process the original image, and convert the original image into a target image whose resolution is equal to the screen resolution, to implement high-quality display on the screen of the image processing device. Therefore, the image processing device may allow images to have relatively low resolution (720p or 1080p) before being displayed, and then when the image processing device needs to display these images, enlarge these images to 2K or 4K to adapt to the screen for display. In this way, power consumption of a mobile device can be greatly reduced while high-resolution display is ensured. An example in which the resolution of the image displayed by the image processing device is equal to the screen resolution of the image processing device is used for description. Certainly, the image processing device may also display images or videos with different resolution based on a requirement of the user. This is not limited in this embodiment of this application. A specific type and a trigger condition of the specified instruction are not limited in this embodiment of this application either.

In this embodiment of this application, for example, a scaling multiple used when the image processing device obtains the plurality of difference maps is 2, and a process in which the image processing device obtains each difference map may include the following steps a to d.

a. Perform upsampling on an original image L (whose resolution is a×b) using an upsampling multiple of 2 to obtain an image H (whose resolution is 2a×2b), and then perform downsampling on the H using a downsampling multiple of 2 to obtain images L1, L2, and L3.

In step a, the image processing device may perform interpolation processing (namely, upsampling), using an interpolation method based on a direction, on the original image L using an interpolation processing multiple of 2, to obtain the image H whose resolution is doubled (both a width and a height are doubled). The interpolation processing indicates that a plurality of new pixels are inserted into the original image L. A pixel value of each new pixel may be calculated by substituting pixel values of a plurality of original pixels into an interpolation function, and the plurality of original pixels are pixels selected from the original image based on the direction and a location of the new pixel in the original image.

After obtaining the H, the image processing device may perform downsampling on the H using the downsampling multiple of 2, for example, extract pixels whose horizontal coordinates are odd numbers and whose vertical coordinates are even numbers from the H to obtain the image L1; extract pixels whose horizontal coordinates are even numbers and whose vertical coordinates are odd numbers from the H to obtain the image L2; and extract pixels whose horizontal coordinates are odd numbers and whose vertical coordinates are odd numbers from the H to obtain the image L3. A location relationship between a pixel in the H and a pixel in each of the L1, the L2, and the L3 may be shown as follows:

$$L1(x,y)=H(2x+1,2y), \quad L2(x,y)=H(2x,2y+1), \text{ and}$$
$$L3(x,y)=H(2x+1,2y+1).$$

It should be noted that four images should be obtained by performing downsampling on the H using the downsampling multiple of 2, but one of the four images is totally the same as the L. Therefore, no subsequent processing is performed on the image. The total sameness means that the two images have same resolution, and pixel values of pixels at same locations in the two images are also the same.

b. Perform upsampling on the L1, the L2, and the L3 using an upsampling multiple of 2 to obtain three images H1, H2, and H3 whose resolution is two times the resolution of the L, and then perform downsampling on the H1, the H2, and the H3 using a downsampling multiple of 2 to obtain three images L11, L22, and L33 that have same resolution as the L.

A process of performing upsampling on the L1, the L2, and the L3 in step b is the same as a process of performing upsampling on the original image in step a, and details are not described herein again. When performing downsampling on the H1, the H2, and the H3, the image processing device extracts pixels whose horizontal coordinates are odd numbers and whose vertical coordinates are even numbers from the H1 to obtain the image L11; extracts pixels whose horizontal coordinates are even numbers and whose vertical coordinates are odd numbers from the H2 to obtain the image L22; and extracts pixels whose horizontal coordinates are odd numbers and whose vertical coordinates are odd numbers from the H3 to obtain the image L33. A location relationship between a pixel in each of the L11, the L22, and the L33 and a pixel in each of the H1, the H2, and the H3 may be shown as follows:

$$L11(x,y)=H1(2x-1,2y), \quad L22(x,y)=H2(2x,2y-1), \text{ and}$$
$$L33(x,y)=H3(2x-1,2y-1).$$

c. Perform subtraction between pixel values of pixels in each of the L11, the L22, and the L33 and pixel values of corresponding pixels in the L, to obtain three difference sets D1, D2, and D3.

In step c, each difference set is a set obtained by arranging a plurality of differences based on coordinate locations, where D1=|L (x, y)−L11 (x, y)|, D2=|L (x, y)−L22 (x, y)|, and D3=|L (x, y)−L33 (x, y)|.

The difference set D1 is used as an example. A difference whose coordinate location is (x, y) in the D1 is obtained by subtracting a pixel value of a pixel whose coordinate location is (x, y) in the L11 from a pixel value of a pixel whose coordinate location is (x, y) in the L. For example, if the pixel value of the pixel whose coordinate location is (x, y) in the L11 is A, and the pixel value of the pixel whose coordinate location is (x, y) in the L is B, the difference whose coordinate location is (x, y) in the D1 is |A−B|.

d. Combine the D1, the D2, the D3, and a 0-element set (all elements are 0, and a quantity of the elements is the same as a quantity of differences in each difference set), such that the image processing device can obtain, using an interpolation method based on each direction, a difference map whose resolution is two times the resolution of the L, where pixel values of pixels in the difference map are values of elements in the D1, the D2, the D3, and the 0-element set.

In a possible implementation, the image processing device may determine each difference in the D1 as a pixel value of each pixel whose horizontal coordinate is an odd number and whose vertical coordinate is an even number in the difference map; determine each difference in the D2 as a pixel value of each pixel whose horizontal coordinate is an even number and whose vertical coordinate is an odd number in the difference map; determine each difference in the D3 as a pixel value of each pixel whose horizontal coordinate is an odd number and whose vertical coordinate is an odd number in the difference map; and determine each 0-element in the 0-element set as a pixel value of each pixel whose horizontal coordinate is an even number and whose vertical coordinate is an even number in the difference map.

The image processing device performs the same processing as steps a to d on the original image using the interpolation method based on a plurality of directions, to obtain the plurality of difference maps. Each difference map corresponds to one direction, and a pixel value of a pixel in the difference map is used to indicate a difference between a pixel value of a pixel in the original image and a pixel value of a pixel at a corresponding location in the image obtained through second downsampling.

It should be noted that an example in which the scaling multiple used when the image processing device obtains the plurality of difference maps is 2 is used in step 601 to describe the process of obtaining each difference map. The scaling multiple used when the image processing device obtains the plurality of difference maps may alternatively be another integer multiple. In this case, a process of obtaining a difference map is the same as that used when the scaling multiple is 2. Details are not described herein again.

It should be noted that the process of obtaining the plurality of difference maps in step 601 may be completed by a plurality of DI modules of the image processing device.

602. Obtain an edge feature parameter of each first pixel in an intermediate image based on pixel values of pixels in the plurality of difference maps, where the edge feature parameter includes an edge direction and an edge strength, resolution of the intermediate image is an integer multiple of the resolution of the original image, and the integer multiple is the same as a scaling multiple used when the plurality of difference maps are obtained.

In this embodiment of this application, the obtaining an edge feature parameter of each first pixel may include the following steps a and b.

a. For each first pixel, obtain a minimum value and an average value of pixel values of pixels that are in the plurality of difference maps and that correspond to a location of the first pixel.

Step a is a process in which the image processing device obtains the edge direction of each first pixel. A first pixel A is used as an example. The pixel values of the pixels that are in the plurality of difference maps (DM1, DM2, . . . , and DMn) and that correspond to a location of the first pixel are respectively A1, A2, . . . , and An, where A1 is the smallest, and the average value of A1, A2, . . . , and An is P. In this case, the image processing device obtains A1 and P.

b. Determine, as the edge direction of the first pixel, an edge direction corresponding to a difference map in which a pixel corresponding to the minimum value is located, and determine the edge strength of the first pixel based on a difference between the minimum value and the average value.

Step b is a process in which the image processing device obtains the edge strength of each first pixel. The first pixel A is used as an example. Because A1 is the smallest, it indicates that an interpolation result based on the direction corresponding to the difference map DM1 in which the pixel corresponding to A1 is located is more accurate. Therefore, the image processing device may determine the direction corresponding to the difference map DM1 as the edge direction of the first pixel A, and determine an edge strength of the first pixel A based on a difference between A1 and P. A larger difference between the minimum value A1 and the average value P indicates a greater edge strength of the first pixel A.

Figure 7:
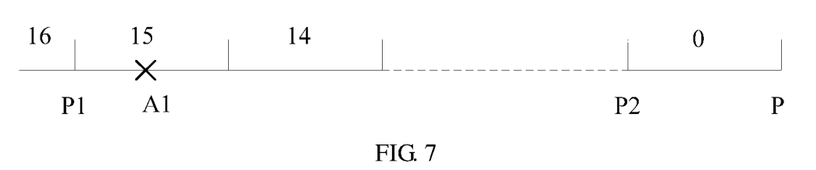
FIG. 7 is a schematic diagram of an edge strength calculation method according to an embodiment of this application.

In a possible implementation, a process of determining the edge strength of the first pixel A may include obtaining two new average values P1 and P2 based on the average value P and two empirical coefficients a1 and a2, where P1=a1*P, P2=a2*P, a1<a2<1, and "*" is used to represent a multiplication operation. FIG. 7 is a schematic diagram of an edge strength calculation method according to an embodiment of this application. On a number axis, m equal parts are obtained through division between P1 and P2, and each equal part corresponds to one edge strength. An example in which the maximum edge strength is 16 is used. Edge strengths on the number axis successively decrease from left to right, and an edge strength corresponding to an equal part into which the minimum value A1 falls is determined as the edge strength of the first pixel A. In FIG. 7, the edge strength of the equal part into which A1 falls is 15.

The pixel values of the pixels in the plurality of difference maps are obtained by performing subtraction between pixels in an image obtained through interpolation based on a direction and pixels in the original image. Therefore, the image processing device can accurately obtain the edge direction and the edge strength of the first pixel based on the pixel values of the pixels in the plurality of difference maps, and a manner of accurately obtaining the edge feature parameter of each first pixel in the intermediate image is provided.

It should be noted that a process of obtaining the edge feature parameter of each first pixel in the intermediate image in step 602 may be completed by the integer-multiple pixel analysis module included in the edge feature analysis module of the image processing device.

603. Obtain, based on the edge feature parameter of each first pixel in the intermediate image, an edge feature parameter of each second pixel whose pixel value is unknown in the target image.

It is found that an edge feature is relatively single in a very small area of an image. Therefore, an edge feature of a peripheral pixel of a current pixel may be used to predict an edge feature of the current pixel. Correspondingly, in this embodiment of this application, the edge feature parameter of each second pixel may be obtained using an edge feature parameter of a peripheral pixel of each second pixel. A specific obtaining process may include the following two manners.

Manner 1: For each second pixel, an edge feature parameter of a first target pixel in the first pixels is determined as the edge feature parameter of the second pixel, where a distance between a location of the first target pixel in the original image and a location of the second pixel in the original image is the shortest.

Figure 8:
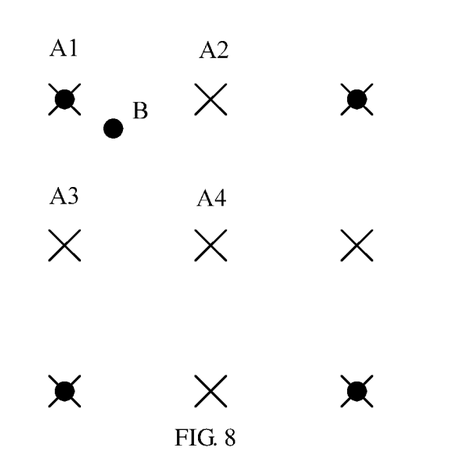
FIG. 8 is a schematic diagram of an edge feature analysis method according to an embodiment of this application.

In this manner, an edge feature parameter of a closest pixel is directly determined as the edge feature parameter of the current pixel. A second pixel B is used as an example. FIG. 8 is a schematic diagram of an edge feature analysis method according to an embodiment of this application. If a distance between a location of a first pixel A1 in the first pixels in the original image and a location of the second pixel B in the original image is the shortest, the image processing device may use the first pixel A1 as the first target pixel, determine an edge direction of the first pixel A1 as an edge direction of the second pixel B, and determine an edge strength of the first pixel A1 as an edge strength of the second pixel B.

Manner 2: The edge feature parameter of the second pixel is determined based on edge feature parameters of a plurality of the first pixels, where distances between locations of the plurality of first pixels in the original image and a location of the second pixel in the original image are less than a preset threshold.

In this manner, the edge feature parameter of the current pixel is obtained based on edge feature parameters of a plurality of closest pixels. A specific obtaining process may include: determining a target direction based on the edge feature parameters of the plurality of first pixels, where an edge direction common to the most first pixels in the plurality of first pixels is the target direction; and determining the target direction as an edge direction of the second pixel, and determining, as an edge strength of the second pixel, an average value or a minimum value of edge strengths of the first pixels whose edge directions are the target direction in the plurality of first pixels.

Referring to FIG. 8, distances between locations of a first pixel A1, a first pixel A2, a first pixel A3, and a first pixel A4 in the first pixels in the original image and a location of a second pixel B in the original image are less than the preset threshold, and edge directions of the A1, the A2, and the A3 are consistent. In this case, the image processing device may determine the edge direction in which the A1, the A2, and the A3 remain consistent as an edge direction of the second pixel B, and determine an average value or a minimum value of edge strengths of the A1, the A2, and the A3 as an edge strength of the second pixel B. The image processing device determines, as the edge direction of the second pixel, an edge direction of a majority of first pixels that have a consistent edge direction in a plurality of first pixels adjacent to the second pixel, and determines an average value or a minimum value of edge strengths of the plurality of first pixels as the edge strength of the second pixel. Therefore, a manner of determining an edge feature parameter of a pixel based on edge feature parameters of a plurality of pixels adjacent to the pixel is provided.

The image processing device may obtain the edge feature parameter of the second pixel based on an edge feature parameter of a first pixel closest to the second pixel, or may obtain the edge feature parameter of the second pixel based on edge feature parameters of a plurality of first pixels adjacent to the second pixel. Therefore, two manners of obtaining the edge feature parameter of each second pixel whose pixel value is unknown in the target image are provided.

It should be noted that a process of obtaining the edge feature parameter of each second pixel whose pixel value is unknown in the target image in step 603 may be completed by the any-multiple pixel analysis module included in the edge feature analysis module of the image processing device.

604. Determine a pixel value of each second pixel based on the edge feature parameter of each second pixel, to obtain the target image.

In this embodiment of this application, a process of determining the pixel value of each second pixel may include the following steps a to d.

a. For each second pixel, obtain a first pixel value of the second pixel through interpolation based on an edge direction of the second pixel.

The interpolation based on the edge direction is similar to the upsampling in step 601. A second pixel A is used as an example. The image processing device may select a plurality of original pixels near a location of the second pixel A in the original image based on an edge direction of the second pixel A, and substitute pixel values of these original pixels into an edge direction interpolation function to calculate a pixel value of the second pixel A.

The pixel value of each second pixel is obtained through interpolation based on the edge direction of the second pixel, to reduce an edge zigzag and improve definition.

b. Obtain a second pixel value of the second pixel through interpolation based on a non-edge direction, where the interpolation based on the non-edge direction includes bilinear interpolation, bicubic interpolation, or multi-phase interpolation.

The second pixel A is used as an example. The image processing device may obtain the pixel value of the second pixel A through interpolation based on any one of bilinear interpolation, bicubic interpolation, and multi-phase interpolation. A specific process is not described in detail.

c. Determine weights of the first pixel value and the second pixel value based on an edge strength of the second pixel.

In step c, a greater edge strength of the second pixel indicates a larger weight of the first pixel value. For the maximum edge strength 16 in step 602, if the edge strength of the second pixel A is 16, the weight of the first pixel value is 1, and the weight of the second pixel value is 0; or if the edge strength of the second pixel A is 8, the weight of the first pixel value is 0.5, and the weight of the second pixel value is 0.5.

d. Perform weighted summation on the first pixel value and the second pixel value based on the weights, to obtain the pixel value of the second pixel.

For example, if the weight of the first pixel value of the second pixel A is 0.5, and the weight of the second pixel value of the second pixel A is 0.5, the pixel value of the second pixel A may be determined as "0.5*the first pixel value+0.5*the second pixel value", where "*" is used to represent a multiplication operation.

After obtaining the pixel value of each second pixel using steps a to d, the image processing device completes assignment of the second pixel whose pixel value is unknown in the target image. Therefore, the image processing device may obtain the final target image based on the pixel value of each second pixel.

The image processing device determines, based on the edge strength of the second pixel, weights of two interpolation results obtained through interpolation based on the edge direction and based on the non-edge direction, and performs weighted summation on the two interpolation results to obtain the pixel value of the second pixel. Therefore, a manner of determining a pixel value based on an edge feature parameter of the pixel is provided. A problem that when a location in an image is at a weak edge, the interpolation results may be inaccurate if interpolation is directly performed based on the edge direction can be avoided by merging the results obtained through interpolation based on the non-edge direction and based on the edge direction. Therefore, in this manner, an edge zigzag is reduced and image quality is improved, and accuracy of the interpolation results can be improved.

It should be noted that a process of determining the pixel value of each second pixel in step 604 may be completed by the any-multiple interpolation module of the image processing device.

In this embodiment of this application, the image processing device obtains an edge feature parameter of an any-multiple pixel (each second pixel in the target image enlarged using any multiple) based on an edge feature parameter of an integer-multiple pixel (each first pixel in the intermediate image enlarged using an integer multiple), and then obtains a pixel value of the any-multiple pixel through interpolation based on the edge feature parameter of the any-multiple pixel.

When the any multiple is an integer multiple, for example, the any multiple is 6, the image processing device may obtain an edge feature parameter of the six-times pixel based on an edge feature parameter of a two-times pixel and an edge feature parameter of a four-times pixel, and obtain a pixel value of the six-times pixel through interpolation based on the edge feature parameter of the six-times pixel. To obtain the edge feature parameter of the two-times (or four-times) pixel, the image processing device may perform downsampling, using a downsampling multiple of 2 (or 4), on a result obtained by performing upsampling on the original image using an upsampling multiple of 2 (or 4), to obtain four (or 16) images with same resolution as the original image, and then need to perform upsampling on these images. A calculation amount in this embodiment of this application is greatly reduced compared with a prior-art process in which downsampling needs to be performed, using a downsampling multiple of 6, on a result obtained by performing upsampling on the original image using an upsampling multiple of 6, to obtain 36 images with same resolution as the original image, and then upsampling needs to be performed on these images.

When the any multiple is a non-integer multiple, for example, the any multiple is 2.5, the image processing device may obtain an edge feature parameter of the 2.5-times pixel based on an edge feature parameter of a two-times pixel, and obtain a pixel value of the 2.5-times pixel through interpolation based on the edge feature parameter of the 2.5-times pixel. Compared with other approaches, this embodiment of this application is applicable to scaling performed using any multiple.

The method provided in this embodiment of this application, an accurate edge feature parameter of each second pixel whose pixel value is unknown in the target image enlarged using any multiple is obtained based on the edge feature parameter of each first pixel in the intermediate image enlarged using an integer multiple, and the pixel value of each second pixel is further obtained through interpolation based on the accurate edge feature parameter. In the foregoing technical solution in which the target image is obtained by enlarging the low-resolution original image using any multiple, a problem such as an edge zigzag and image blurring during image scaling in an interpolation method is overcome, and a requirement for performing scaling on an image using any multiple is met.

Figure 9:
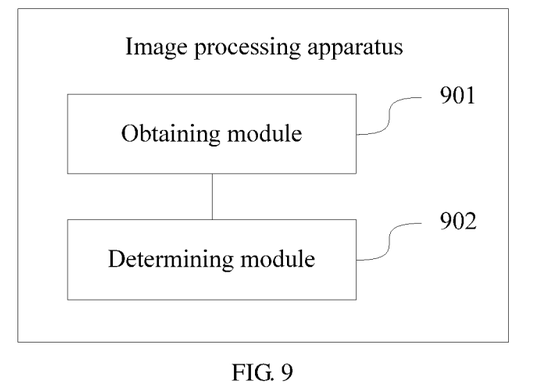
FIG. 9 is a schematic structural diagram of an image processing apparatus according to an embodiment of this application.

FIG. 9 is a schematic structural diagram of an image processing apparatus according to an embodiment of this application. Referring to FIG. 9, the apparatus includes an obtaining module 901 and a determining module 902.

The obtaining module 901 is configured to obtain a plurality of difference maps of an original image.

The obtaining module 901 is further configured to obtain an edge feature parameter of each first pixel in an intermediate image based on pixel values of pixels in the plurality of difference maps, where the edge feature parameter includes an edge direction and an edge strength, resolution of the intermediate image is an integer multiple of resolution of the original image, and the integer multiple is the same as a scaling multiple used when the plurality of difference maps are obtained.

The obtaining module 901 is further configured to obtain, based on the edge feature parameter of each first pixel in the intermediate image, an edge feature parameter of each second pixel whose pixel value is unknown in a target image, where resolution of the target image is any multiple of the resolution of the intermediate image.

The determining module 902 is configured to determine a pixel value of each second pixel based on the edge feature parameter of each second pixel, to obtain the target image.

In a possible implementation, the obtaining module 901 is configured to perform a process of obtaining the edge feature parameter of each first pixel in the intermediate image in step 602.

In a possible implementation, the obtaining module 901 is configured to perform a process of obtaining the edge feature parameter of each second pixel whose pixel value is unknown in the target image in step 603.

In a possible implementation, the obtaining module 901 is configured to perform a process of obtaining an edge strength of each second pixel whose pixel value is unknown in the target image in step 603.

In a possible implementation, the determining module 902 is configured to perform a process of determining the pixel value of each second pixel in step 604.

In this embodiment of this application, an accurate edge feature parameter of each second pixel whose pixel value is unknown in the target image enlarged using any multiple is obtained based on the edge feature parameter of each first pixel in the intermediate image enlarged using an integer multiple, and the pixel value of each second pixel is further obtained through interpolation based on the accurate edge feature parameter, such that a problem such as an edge zigzag and image blurring in an interpolation method is overcome, and a requirement for performing scaling on an image using any multiple is met.

It should be noted that when the image processing apparatus provided in the foregoing embodiment processes an image, division of the foregoing function modules is merely used as an example for description. In an actual application, the functions may be allocated to different function modules for implementation as required. To be specific, an internal structure of the device is divided into different function modules to implement all or some of the functions described above. In addition, the image processing apparatus provided in the foregoing embodiment has a same concept as the image processing method embodiment. For a specific implementation process of the image processing apparatus, refer to the method embodiment. Details are not described herein again.

In an example embodiment, a non-temporary computer readable storage medium that includes an instruction, for example, a memory that includes an instruction is further provided. The instruction may be executed by the processor in the image processing apparatus to complete the image processing method in the foregoing embodiment. For example, the non-temporary computer readable storage medium may be a read-only memory (ROM), a random access memory (RAM), a compact disc read-only memory (CD-ROM), a tape, a floppy disk, or an optical data storage device.

A person of ordinary skill in the art may understand that all or some of the steps of the embodiments may be implemented by hardware or a program instructing related hardware. The program may be stored in a computer readable storage medium. The storage medium may include a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

The invention claimed is:

1. An image processing method, comprising:
 obtaining a plurality of first images each based on application of a different set of scaling operations to an original image;
 obtaining a plurality of difference maps based on the first images and the original image;
 obtaining an edge feature parameter of each first pixel in an intermediate image based on pixel values of pixels in the plurality of difference maps, wherein each edge feature parameter comprises an edge direction and an edge strength, wherein a resolution of the intermediate image is the same as a common resolution of the difference maps that is an integer multiple of resolution of the original image, and wherein the integer multiple is the same as a scaling multiple used when the plurality of difference maps are obtained;
 obtaining, based on the edge feature parameter of each first pixel in the intermediate image, an edge feature parameter of each second pixel whose pixel value is unknown in a target image, wherein a resolution of the target image is any multiple of the resolution of the intermediate image; and
 determining a pixel value of each second pixel based on the edge feature parameter of each second pixel to obtain the target image.

2. The image processing method of claim 1, wherein obtaining the edge feature parameter of each first pixel in the intermediate image based on the pixel values of pixels in the plurality of difference maps comprises:
 obtaining, for each first pixel, a minimum value and an average value of pixel values of pixels that are in the plurality of difference maps and that correspond to a location of the first pixel;
 determining, as the edge direction of the first pixel, an edge direction corresponding to one of the plurality of difference maps in which a pixel corresponding to the minimum value is located; and
 determining the edge strength of the first pixel based on a difference between the minimum value and the average value.

3. The image processing method of claim 1, wherein obtaining, based on the edge feature parameter of each first pixel in the intermediate image, the edge feature parameter of each second pixel whose pixel value is unknown in the target image comprises determining, for each second pixel, an edge feature parameter of a first target pixel in the first pixels as the edge feature parameter of the second pixel, wherein a distance between a location of the first target pixel in the original image and a location of the second pixel in the original image is a shortest distance.

4. The image processing method of claim 1, wherein obtaining, based on the edge feature parameter of each first pixel in the intermediate image, the edge feature parameter of each second pixel whose pixel value is unknown in the target image comprises determining the edge feature parameter of the second pixel based on edge feature parameters of a plurality of the first pixels, wherein distances between locations of the plurality of first pixels in the original image and a location of the second pixel in the original image are less than a preset threshold.

5. The image processing method of claim 4, wherein determining the edge feature parameter of the second pixel based on the edge feature parameters of the plurality of first pixels in the first pixels comprises:
- determining a target direction based on the edge feature parameters of the plurality of first pixels, wherein an edge direction common to a majority of first pixels in the plurality of first pixels is the target direction;
- determining the target direction as an edge direction of the second pixel; and
- determining, as an edge strength of the second pixel, an average value of edge strengths of the first pixels whose common edge direction is the target direction.

6. The image processing method of claim 4, wherein determining the edge feature parameter of the second pixel based on the edge feature parameters of the plurality of first pixels in the first pixels comprises:
- determining a target direction based on the edge feature parameters of the plurality of first pixels, wherein an edge direction common to a majority of first pixels in the plurality of first pixels is the target direction;
- determining the target direction as an edge direction of the second pixel; and
- determining, as an edge strength of the second pixel, a minimum value of edge strengths of the first pixels whose common edge direction is the target direction.

7. The image processing method of claim 1, wherein determining the pixel value of each second pixel based on the edge feature parameter of each second pixel comprises:
- obtaining, for each second pixel, a first pixel value of the second pixel through interpolation based on an edge direction of the second pixel;
- obtaining a second pixel value of the second pixel through interpolation based on a non-edge direction;
- determining weights of the first pixel value and the second pixel value based on an edge strength of the second pixel; and
- performing weighted summation on the first pixel value and the second pixel value based on the weights to obtain the pixel value of the second pixel.

8. The image processing method of claim 7, wherein the interpolation based on the non-edge direction comprises bilinear interpolation.

9. The image processing method of claim 7, wherein the interpolation based on the non-edge direction comprises bicubic interpolation.

10. The image processing method of claim 7, wherein the interpolation based on the non-edge direction comprises multi-phase interpolation.

11. An image processing apparatus, comprising:
- a non-transitory computer-readable memory having processor-executable instructions stored thereon; and
- a processor coupled to the non-transitory computer-readable memory and configured to execute the processor-executable instructions to configure the image processing apparatus to:
- obtain a plurality of first images each based on application of a different set of scaling operations to an original image;
- obtain a plurality of difference maps based on the first images and the original image;
- obtain an edge feature parameter of each first pixel in an intermediate image based on pixel values of pixels in the plurality of difference maps, wherein each edge feature parameter comprises an edge direction and an edge strength, wherein a resolution of the intermediate image is the same as a common resolution of the difference maps that is an integer multiple of resolution of the original image, and wherein the integer multiple is the same as a scaling multiple used when the plurality of difference maps are obtained;
- obtain, based on the edge feature parameter of each first pixel in the intermediate image, an edge feature parameter of each second pixel whose pixel value is unknown in a target image, wherein a resolution of the target image is any multiple of the resolution of the intermediate image; and
- determine a pixel value of each second pixel based on the edge feature parameter of each second pixel to obtain the target image.

12. The image processing apparatus of claim 11, wherein the processor is further configured to execute the processor-executable instructions to configure the image processing apparatus to:
- obtain, for each first pixel, a minimum value and an average value of pixel values of pixels that are in the plurality of difference maps and that correspond to a location of the first pixel;
- determine, as the edge direction of the first pixel, an edge direction corresponding to one of the plurality of difference maps in which a pixel corresponding to the minimum value is located; and
- determine the edge strength of the first pixel based on a difference between the minimum value and the average value.

13. The image processing apparatus of claim 11, wherein the processor is further configured to execute the processor-executable instructions to configure the image processing apparatus to determine, for each second pixel, an edge feature parameter of a first target pixel in the first pixels as the edge feature parameter of the second pixel, wherein a distance between a location of the first target pixel in the original image and a location of the second pixel in the original image is a shortest distance.

14. The image processing apparatus of claim 11, wherein the processor is further configured to execute the processor-executable instructions to configure the image processing apparatus to determine the edge feature parameter of the second pixel based on edge feature parameters of a plurality of first pixels in the first pixels, wherein distances between locations of the plurality of first pixels in the original image and a location of the second pixel in the original image are less than a preset threshold.

15. The image processing apparatus of claim 14, wherein the processor is further configured to execute the processor-executable instructions to configure the image processing apparatus to:
- determine a target direction based on the edge feature parameters of the plurality of first pixels, wherein an edge direction common to a majority of first pixels in the plurality of first pixels is the target direction;
- determine the target direction as an edge direction of the second pixel; and
- determine, as an edge strength of the second pixel, an average value of edge strengths of the first pixels whose common edge direction is the target direction.

16. The image processing apparatus of claim 14, wherein the processor is further configured to execute the processor-executable instructions to configure the image processing apparatus to:
- determine a target direction based on the edge feature parameters of the plurality of first pixels, wherein an edge direction common to a majority of first pixels in the plurality of first pixels is the target direction;

determine the target direction as an edge direction of the second pixel; and determine, as an edge strength of the second pixel, a minimum value of edge strengths of the first pixels whose common edge direction is the target direction.

17. The image processing apparatus of claim 11, wherein the processor is further configured to execute the processor-executable instructions to configure the image processing apparatus to:

obtain, for each second pixel, a first pixel value of the second pixel through interpolation based on an edge direction of the second pixel;

obtain a second pixel value of the second pixel through interpolation based on a non-edge direction;

determine weights of the first pixel value and the second pixel value based on an edge strength of the second pixel; and perform weighted summation on the first pixel value and the second pixel value based on the weights to obtain the pixel value of the second pixel.

18. The image processing apparatus of claim 17, wherein the interpolation based on the non-edge direction comprises bilinear interpolation.

19. The image processing apparatus of claim 17, wherein the interpolation based on the non-edge direction comprises bicubic interpolation.

20. The image processing apparatus of claim 17, wherein the interpolation based on the non-edge direction comprises multi-phase interpolation.

* * * * *